United States Patent [19]

Wegrzyn

[11] Patent Number: 4,615,828
[45] Date of Patent: Oct. 7, 1986

[54] METHOD AND APPARATUS FOR DETECTING HYDROCARBON FUEL LEAKS

[75] Inventor: Jeffrey G. Wegrzyn, Alpharetta, Ga.

[73] Assignee: Lockheed Corporation, Calabasas, Calif.

[21] Appl. No.: 674,934

[22] Filed: Nov. 26, 1984

Related U.S. Application Data

[63] Continuation-in-part of Ser. No. 607,450, May 7, 1984.

[51] Int. Cl.$^4$ .................. G01N 31/00; G01N 33/00
[52] U.S. Cl. .................. 252/408.1; 252/960; 252/964; 436/3
[58] Field of Search ............ 252/408.1, 960, 964; 436/3

[56] References Cited

U.S. PATENT DOCUMENTS

| | | | |
|---|---|---|---|
| 2,254,609 | 9/1941 | Kinzer | 252/964 |
| 2,665,257 | 12/1950 | Potter | 252/964 |
| 3,006,861 | 10/1961 | Browning | 252/964 |
| 3,287,156 | 11/1966 | Griffith | 252/964 |
| 3,370,013 | 7/1964 | Labac | 252/964 |
| 3,388,587 | 6/1968 | Hara | 252/964 |
| 3,489,703 | 1/1970 | Borucki | 252/960 |
| 3,744,295 | 7/1973 | Allinikov | 252/960 |
| 3,803,051 | 4/1974 | Molina | 252/960 |
| 3,856,465 | 12/1974 | Lipscomb | 252/964 |
| 4,000,427 | 12/1976 | Kuzmina | 252/960 |
| 4,049,568 | 9/1977 | Molina | 252/960 |
| 4,124,484 | 11/1978 | Sherwin | 252/960 |
| 4,295,362 | 10/1981 | White | 252/960 |

FOREIGN PATENT DOCUMENTS 0920611 4/1982 U.S.S.R. .................. 252/960

Primary Examiner—John F. Terapane
Assistant Examiner—S. Wolffe
Attorney, Agent, or Firm—Stanley L. Tate

[57] ABSTRACT

A method of and apparatus for detecting fuel leaks employing color variable indicators. The method comprises the steps of preparing and applying a water soluble non-staining indicator dye to a test surface, observing color changes indicative of hydrocarbon leaks and removing the indicator dye from the test surface. The apparatus comprises in combination means for preparing the indicator dye, means for applying the indicator dye to the test surface and means for removing the dye from the test surface. The indicator dye comprises a major portion of a dry inert mineral carrier from about 0.1 to about 5.0 weight percent of a direct dye which is non-staining on painted surfaces and which does not migrate into or penetrate polyurethane or epoxy resin base painted surfaces, and from about 0.1 to about 1.0 weight percent of a surfactant.

8 Claims, 2 Drawing Figures

METHOD AND APPARATUS FOR DETECTING HYDROCARBON FUEL LEAKS

CROSS REFERENCE TO RELATED APPLICATIONS

This Application is a continuation-in-part of copending application Ser. No. 607,450 filed May 7, 1984.

TECHNICAL FIELD

This invention relates to an improved leak indicator and a method of using the same to detect fuel leaks in aircraft. More particularly, it relates to an improved leak indicator which is easily removed from surfaces being tested and which does not stain the painted surfaces being tested.

BACKGROUND ART

Leak detection is an essential aspect of quality control in the construction of aircraft fuel tanks and the like. To check the integrity of tanks during and after construction a variety of methods are used, for example, the tank is pressurized with air and a soap film is applied to the area being inspected and the formation of bubbles is visually noted. Another method involves pressurizing the tank being tested with ammonia gas and spraying the surface being tested with a viscous liquid which contains an acid-base indicator which will change color if a tank leak allows ammonia gas to escape. Still another method of testing for leaks involves pressurizing the tank with helium gas and detecting escaping gas with a mass spectrometer. Yet another method for detecting leaks in fuel tanks uses thermographic techniques. Another method of detecting fuel leaks in both partially assembled or assembled aircraft involves applying an oil red O dyed talc to the surface being tested. The talc is applied by mixing it with 1,1,1 trichloroethane and spraying the mixture onto the surface being tested. The trichloroethane quickly evaporates leaving a pink powder on the test area. This method has been found to be an effective indicator of fuel tank leaks, however, the material used in the test procedure has several undesirable characteristics. The dye oil red O is a petroleum dye that is soluble in hydrocarbon solvents such as 1,1,1 trichloroethane and JP-5 jet fuel and this solubility causes some of the dye to migrate form the talc carrier into the surface of the paint used on the test area thereby staining it. Another undesirable characteristic is the similarity of the relation of the oil red O dye with water and its reaction to jet fuel. If either fuel or water contacts the oil red O impregnated talc the color of the talc changes from pink to red thus making the test meaningless if water is present as a mist, spray, or as falling rain. This characteristic of the dye decreases the usefulness of the test in the field. Other methods of detecting leaks are disclosed in U.S. Pat. Nos. 3,368,994; 3,287,156; and 3,266,920.

DISCLOSURE OF THE INVENTION

Accordingly, it is an object of the present invention to provide a leak detection method which is applicable to any container of hydrocarbon fuel.

Another object of the present invention is to provide a leak detection method which will not color or stain the surface being tested.

It is another object of the present invention to provide a dry indicator material capable of detecting hydrocarbon fuels without coloring or staining the surface being tested.

Yet another object of the present invention is to provide an indicator material which is capable of distinguishing between water and hydrocarbon fuels.

Yet another object of the present invention is to provide a method of detecting hydrocarbon fuel leaks which will not damage the surface being tested.

Still another object of the present invention is to provide a method of producing an indicator material suitable for detecting hydrocarbon fuel leaks without staining the surface being tested.

A further object of the present invention is to provide a method of applying a dry test material to a surface without damage to the surface being tested.

Still a further object of the present invention is to provide a method of removing an indicator from a test surface without staining or otherwise damaging the test surface.

These and other objects, features and advantages of the present invention are accomplished by providing a method of and apparatus for detecting hydrocarbon fuel leaks in a vessel, tank or container for the same which comprise a new indicator powder consisting of a direct dye in combination with inert mineral carrier. The direct dye used is soluble in water and lower chain alcohols and insoluble in hydrocarbon fuels. The dye is non-staining on painted surfaces and does not migrate into or penetrate painted surfaces containing a polyurethane or epoxy resin base. The method of preparing the new indicator powder of the present invention comprises the steps of combining a direct dye in powder form with sufficient inert mineral carrier in a mill, milling dye and mixing the dye and mineral carrier to evenly disperse the dye powder in the mineral carrier until a powder having an even color and uniform particle size distribution is produced. The dyed powder or indicator powder is subsequently used to detect hydrocarbon leaks by introducing fuel into a fuel tank and allowing the fuel to soak the container for a time, applying the indicator powder to the surface being tested, observing any color changes that might take place and removing the indicator powder from the surface being tested.

The principal feature of the present invention is the provision of method and means for the detection of leaks in assembled and mounted fuel tanks without staining or otherwise damaging painted test surfaces.

Another important feature of the present invention is the provision of a composition of matter suitable for detecting hydrocarbon liquids by color change which is non-staining on painted surfaces and which does not migrate into or penetrate painted surfaces coated with a paint containing a polyurethane or epoxy resin base.

Yet another important feature of the present invention is the provision of a method of manufacturing a composition of matter suitable for detecting hydrocarbon liquids by color change which is non-staining on painted surfaces.

Still another important feature of the present invention is the ability of the indicator powder to be removed from a test surface merely by flushing the surface with water.

Another important feature of the present invention is the ability of the indicator powder to be removed from a test surface merely by brushing.

A further feature of the present invention is the provision of a portable aerosol container of the detecting powder which can be used in areas not equipped with large spray apparatus. Thus, the ability to locate the fuel tank leaks under field conditions is substantially improved.

One advantage of the present invention is that the present leak detection method complements other leak detection methods such as thermographic methods which are used principally on unassembled sections and tanks.

Another advantage of the present leak detecting method is the non-staining nature of the dye used to produce the indicator powder in that costly and time consuming clean-up after testing is eliminated.

In accordance with the present invention the method of detecting hydrocarbon leaks further comprises the step of combining the dyed carrier with an organic solvent and a surfactant to form an indicator suspension and spraying the indicator suspension onto the surface. The organic solvent used to prepare the suspension must be sufficiently volatile to volatilize during spraying thereby allowing for the deposition of a dry, finely-divided indicator powder onto the surface being tested.

The method of detecting hydrocarbon fuel leaks further comprises spraying the indicator suspension onto the surface being tested at pressure less than or equal to 45 psi above the ambient pressure.

The present invention also comprises the composition of matter for detecting leaks in aircraft fuel tanks comprising a major portion of a dry mineral carrier selected from a group consisting of diatomaceous earth, kaplin clay, talc, fumed silica, silicondioxide and mixtures thereof from about 0.1 to about 1.0 weight percent of a surfactant selected from a group consisting of fluoroaliphatic polymeric esters, acetylenic diols and Zonyl ® fluro surfactants, and from about 0.1 to about 5.0 weight percent of a water soluble salt of a sulfonic acid of an azo dye selected from a group consisting of:

7-hydroxy-8-(4-phenylazophenylazo)-1,3-naphthalindesulfonic acid disodium salt;
4,6-dihydroxy-3[4-[1-[4-[[1-hydroxy-7-[(phenylsulfonyl)oxy]-3-sulfo-2-naphthalenyl]azo]phenyl]cyclohexyl]phenyl]azo]-2-naphthalenesulfonic acid disodium salt;
N-8 4-[[4-(diethylamino)phenyl][4-[ethyl[3-sulfophenyl)methyl]amino]phenyl]methylene]-2,5-cyclohexadien-1-yliden]-N-ethyl-3-ethyl-3-sulfohydroxide-, benzenemethaniminium inner salt disodium salt;
5-(acetylamino)-4-hydroxy-3-(phenylazo)-2,7-naphthalenedissulfonic acid disodium salt;
2,2'-[9,10-dihydro-9,10-dioxo-1,4-anthracenediyl)-diimino]bis[5-methyl-benzenesulfonic acid disodium salt]
7-hydroxy-8-(phenylazo)-1,3-naphthalenedisulfonic acid disodium salt;
4-hydroxy-3-[[4-methyl-3-[phenylamino)sulfonyl]-phenyl]azo]-1-naphthalenesulfonic acid monosodium salt;
5-(acetylamino)-4-hydroxy-3-[(2-methylphenyl)azo]-2,7-naphthalenedisulfonic acid disodium salt;
N-ethyl-N-[4-[[4-[ethyl[(3 sulfophenyl)methyl]amino]-cyclohexadien-1-ylidene]-3-sulfo-hydroxide benzenemethanominium inner salt sodium salt;
2,2'-[(9,10-dihydro-9,10-dioxo-1,4-anthracenediyl)-diimino]bis[5-butyl-,benzenesulfonic acid]disodium salt;
2,2'-[9,10-dihydro-5,8-dihydroxy-9,10-dioxo-1,4-anthracenediyl)diimino]bis[5-methyl-benzenesulfonic acid]disodium salt;
4-[(2-hydroxy-1-naphthalenyl)azo]-benzenesulfonic acid monosodium salt;
5-(acetylamino)-3-[[4-(acetylamino)phenyl]azo]-4-hydroxy-2,7-naphthalenedisulfonic acid]disodium salt;
4-[(2-hydroxy-1-naphthalenyl)azo]-1-napthalenesulfonic aicd monosidum salt;
5-[(2-hydroxy-1-naphthalenyl)azo]-1-naphthalenesulfonic acid monosodium salt;
5-(acetylamino)-4-hydroxy-3-phenylazo-2,7-naphthalenedisulfonic acid disodium salt;
4-hydroxy-3-[(4-sulfo-1-naphthalenyl)azo]-1-naphthalenesulfonic acid disodium salt;
3,3'-[cyclohexylidenebis[(2-methyl-4,1-phenylene)azo]]bis[4,6-dihydroxy-4-naphthalenesulfonic acid disodium salt;
7-hydroxy-8-[[4-(phenylazo)phenyl]azo]-1,3-naphthalenedisulfonic acid disodium salt;
4-[(2,4-dimethylphenyl)azo]-3-hydroxy-2,7-naphthalenedisulfonic acid disodium salt;
7-hydroxy-8-[(4-sulfo-1-naphthalenyl)azo]-1,3,-naphthalenedisulfonic acid tridosium salt;
N-[-4[[4-dimethylamino)phenyl]][4-[ethyl[3-sulfophenyl)methyl]amino]phenyl]]mithylene]-2,5-cyclohexadien-1- yliden]-N-ethyl-3-sulfo, benzenemethanaminium hydroxide inner salt sodium salt;
N-[-[[4-(dimethylamino)phenyl]][2-ethoxy-4-[(4-methylsulfophenyl)amino]-2-sulfophenyl]methylene]-2,5-cyclohexadien-1-ylidene]-N-methylhydroxide methanaminium inner salt monosodium salt;
7-hydroxy-8-(1-naphthalenylazo)-1,3 naphthalendisulfonic acid disodium salt;
N-[4-[[4-diethylamino)phenyl]phenylmethylene]-2,5-cyclohexadien-1-ylidene]-N-ethyl-ethanaminium sulfate;
4-hydroxy-5-[[(4-methylphenyl)sulfonyl]amino]-3-(phenylazo)-2-7,naphthalenedisulfonic acid disodium salt;
4-amino-3-[(2,5-dichlorophenyl)azo]-5-hydroxy-6-[[4'-[(4-hydroxyphenyl)azo][1,1'-biphenyl]-4-yl]azo]2,7-naphthalenedisulfonic acid disodium salt;
7,7'-(carbonyldiimino)bis[4-hydroxy-3-(phenylazo)-2-naphthalenesulfonic acid disodium salt; 3-[[4-[[6-[(4-aminobenzoyl)amino]-1-hydroxy-3-sulfo-2-naphthalenyl]azo]-3,5-dimethylphenyl]azo]-1,5-naphthalenedisulfonic acid tri sodium salt;
5-[[4'-[(2-amino-8-hydroxy-6-sulfo-1-naphthalenyl)azo][1,1]-biphenyl]-4-yl]azo]-2-hydroxy-benzoic acid disodium salt;
3-[[4-(acetylamino)phenyl]azo]-4-hydroxy-7-[[[[5-hydroxy-6-(phenylazo)-7-sulfo-2 naphthalenyl]amino]carbonyl]amino]-2 naphthalenesulfonic acid disodium salt;
4-amino-5-hydroxy-6-[[4'-[(4-hydroxyphenyl)azo][1,1'-biphenyl]-4-yl]azo]-3-[(4-nithophenyl)azo]2,7-naphthalene disulfonic acid disodium salt;
4-amino-5-hydroxy-3-[[4'-[(4-hydroxy phenyl)azo][1,1'-biphenyl]-4-yl]azo]-6-(phenylazo)-2,7-naphthalenedisulfonic acid disodium salt;
5-[[4'-[[8-amino-1-hydroxy-7-[(4-nitrophenyl)azo]-3,6-disulfo-2-naphthalenyl]azo [[1,1'-biphenyl]-4-yl]azo]-2-hydroxy-benzoic aicd trisodium salt;
2,-]2-(4-nitro-2-sulophenyl)ethenyl]-5-[[4-[(4-sulfophenyl)azo]phenyl]-NNO-azoxy]-benzenesulfonic acid trisodium salt;

5,5'[carbonylbis[imino(2-sulfo-4,1-phenylene)azo][-[bis[6-amino-V-hydroxy-2-naphthalenesulfonic]acid tetrasodium salt;

4,4'-[carbonylbis[imino (5-methoxy-2-methyl-4,1-phenylene)azo]]bis[5-hydroxy-2,7-naphthalenedisulfonic acid]tetrasodium salt;

7-(benzoylamino)-4-hydroxy -3-[[4-[(4-sulfophenyl)azo]phenyl]azo]-2-naphthalenesulfonic acid disodium salt;

[-[[5,5'-[carbonlyl bis[imino(2-hydroxy-5 sulfo-4,1-phenylene)azo]]bis[6-hydroxy-2-naphthalenesulfonate]]ditetroammonium cuprate

[-[[7,7'-(carbonyldiimino)bis[4 hydroxy-3-[(2-hydroxy-5-sulfophenyl)azo]-2-naphthalenesulfonato](8-)]]dicuprate tetrasodium;

[-[[7,7'-iminobis[4-hydroxy-3-[[2-hydroxy-5-[(methylamino)sulfonyl]azo]-2-naphthalenesulfonato]](6-)]]dicuprate disodium;

7-(benzoylamino)-4-hydroxy-3-[[2-methoxy-5-methyl-4-[(4-sulfophenyl)azo]phenyl]azo]-2-naphthalenesulfonic acid disodium salt;

5-[[4'[(26-diamino-3-methyl-5-sulfophenyl)azo]-3,3'-dimethyl [1,1'-biphenyl]-4-yl]azo]-2-hydroxy-benzoic acid disodium salt;

7,7'-iminobis[4-hydroxy-3-(phenylazo)-2-naphthalenesulfonic acid disodium salt;

3-3'-[3,3'-dimethyl[1,1'-biphenyl]-4,4'-diyl)bis(azo)]-bis[4-amino-5-hydro y-1,-naphthalenesulfonic acid disodium salt;

7,7'-iminobis[4-hydroxy-3-(phenylazo)-1-naphthelenesulfonic acid disodium salt;

5-[[4'-[2-amino-8-hydroxy-6-sulfo-1-naphthalenyl)azo][1,1'biphenyl]-4-yl]azo]-2-hydroxy-benzoic acid disodium salt; 5,5'[carbonylbis[imino(1-hydroxy-3-sulfo-6,2-naphthalenediyl)azo][bis-1 naphthalenesulfonic acid tetrasodium salt;

7,7'iminobis[4-hydroxy-3-(phenylazo)-2-naphthaolenesulfonic acid disodium salt;

3-[[4-(acetylamino)phenyl]azo]-4-hydroxy-7-[[[5-hydroxy-6-(phenylazo)-7-sulfo-2-naphthalenyl-]amino]carbonyl]amino]-2-naphthalenesulfonic acid;

8-[[4'-[4-ethoxyphenyl)azo][1,1'-biphenyl]-4-yl]azo]-7-hydroxy-1,3-naphthalenedisulfonic acid disodium salt;

3-[[4-(acetylamino)phenyl]azo]-4-hydroxy-7-[[[[5-hydroxy-6-)phenylazo)-7-sulfo-2-naphthalenyl-]amino]carbonyl]amino]-2-naphthalenesulfonic acid disodium salt;

5,5'[[1,1'biphenyl]-4,4'-diylbis(azo)]bis[6-amino-4-hydroxy-2-naphtholene sulfonic acid disodium salt;

7-amino-3-[[4'[(2-amino-8-hydroxy-6-sulfo-1-naphthalenyl)azo][1,1'-biphenyl]-4-yl]azo]-4-hydroxy-2-naphthalene sulfonic acid disodium salt;

5-[[4-[[1-hydroxy-6-(phenylamino)-3-sulfo-2-naphthalenyl]azo]-5-methoxy-2-methylphenyl]azo]-1-naphtholenesulfonic acid disodium salt.

Zonyl is a trademark of DuPont, Incorporated and as used in this application refers to fluo surfactants having the following structrual formulas: $R_fCH_2CH_2O(CH_2CH_2O)_xH$, $R_fCH_2CH_2O(CH_2CH_2O)_xH$, $R_fCH_2CH(OCOCH_3)$ $CH_2N(CH_3)_2$ $CH_2CO_2$ and $(R_fCH_2CH_2O)_{1,2}$ $P(O)(OH)_{2,1}$ Where $R_f=F(CF_2CF_2)3-8$ The composition of matter of the present invention also comprises lower chain alcohol soluble salts of sulfonic acids of azo dyes which are essentially non-staining on painted surfaces and which will not migrate into or penetrate painted surfaces containing a polyurethane or epoxy resin base.

The composition of matter of the present invention also comprises a direct dye in powder form dispersed in inert mineral carrier particles having a diameter of less than 15 microns to form an indicator powder.

Ideally the composition of matter of the present invention comprises a direct dye in powder form dispersed in inert mineral carrier particles having a diameter greater than 1 micron and less than 10 microns to form an indicator powder.

Also, in accordance with the present invention, the indicator powder is milled to produce an indicator powder having an even color and uniform particle size. One method of milling the indicator cake is using a jar mill with a charging ratio of about 40 percent by volume grinding media and about 25 percent by volume indicator cake. Ideally the milling is carried out by using elongated members such as steel rods placed inside a milling container adequately mills and mixes the dye and the mineral carrier without resorting to the use of a milling media such as small stones thereby eliminating the need to shake the mixture through a screen to remove the milling compound.

Also in accordance wit the present invention the indicator is applied to the surface being tested as an aerosol spray and in this application the suspension will include from about 0.1 to about 1.0 weight percent of a suspending agent such as aluminum stearate, calcium stearate, magnesium stearate and stearic acid and may be contained in a device equipped with a mixing means or agitator to prevent hard settling of the suspended indicator.

These and other objects, features and advantages of the present invention will be more apparent from the the following more detailed description of the preferred embodiments as illustrated in the accompanying drawings. The drawings are not necessarily to scale, emphasis instead being placed on illustrating the principles of the invention.

BEST MODE FOR CARRYING OUT THE INVENTION

Figure 1:
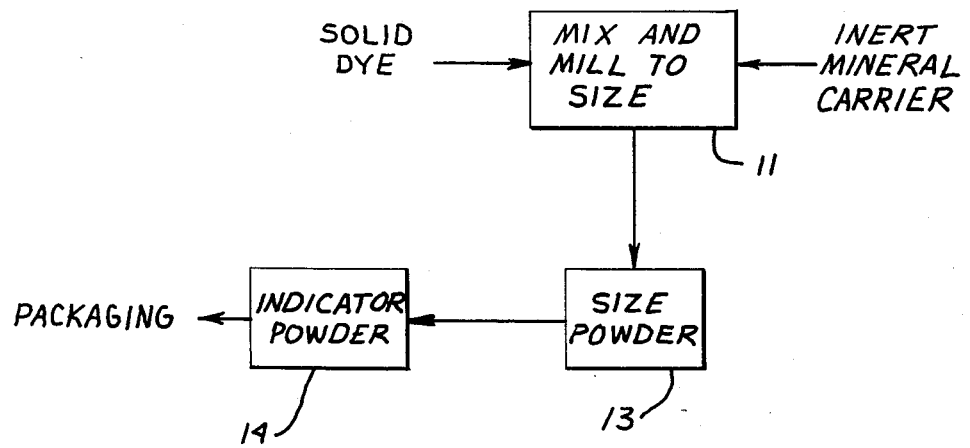
FIG. 1 is a block diagram illustrating the steps of a method of a preferred embodiment of the invention.

A general schematic illustration of a preferred method for manufacturing indicator powder appears in FIG. 1. A suitable dye in powder form and an inert mineral carrier are combined. For example, 9.0 grams of the direct dye 7-hydroxy-8-(4-phenylazophenylazo)-1, 3-naphthalindedisulfonic acid disodium salt (croceine MOO dye) is mixed with one pound of inert mineral carrier. In this particular instance a ratio of 9 grams dye per pound of mineral carrier produces an indicator powder which will turn a vivid red color when wet with a hydrocarbon base liquid. The maintenance of a red color is preferable because the color change resulting when hydrocarbon fuels contact the indicator powder is easier to see thereby reducing the possibility that a leak will not be detected because the color change was difficult to see. The mineral carrier with which the dye powder is mixed might be diatomaceous earth, kaolin, talc, fumed silica, silicon dioxide or a mixture of such inert mineral carriers. The use of powdered dyes eliminates the need to form a slurry of dye mineral carrier and solvent thereby eliminating the need for costly and time consuming drying process used to prepare the indicator powder. The powder is mixed and milled in a milling container with several elongated bars or the like to mix the dye powder and the mineral carrier while at the same time exerting enough shearing force on the ingredients to equalize the particle size of the resultant indicator mixture. Care must be taken to prevent overmilling the carrier or the absorbant structure of the mineral particles will be destroyed and the sensivity of the procedure will be reduced. One method of milling is a jar mill in which 40 percent by volume of the mill charge is grinding media and 25 percent by volume of the mill charge is the indicator being ground into a powder having an average size less than 10 microns. Once milling is complete, the indicator powder is ready for use in detecting hydrocarbon fuel leaks or packaging for storage and subsequent use.

The indicator powder produced by this process generally consists of a major portion, from about 99.9 weight percent to about 95.0 weight percent of a dry inert mineral carrier and from about 0.1 to about 5.0 weight percent of a dye which is soluble in water and lower chain alcohols. The dye is also essentially nonstaining on painted surfaces and does not migrate into or penetrate painted surfaces which contain a polyurethane or an epoxy resin base. Among the dyes suitable for use in the indicator powder are:

7-hydroxy-8-(4-phenylazophenylazo)-1,3-naphthalindesulfonic acid disodium salt;

4,6-dihydroxy-3[4-[1-[4-[[1-hydroxy-7-[(phenylsulfonyl)oxy]-3-sulfo-2-naphthalenyl]azo]phenyl]cyclohexyl]phenyl]azo]-2-naphthalenesulfonic acid disodium salt;

N-[4-[[4-(diethylamino)phenyl][4-[ethyl [3-sulfophenyl)methyl]amino]phenyl]methylene]-2,5-cyclohexadien-1-yliden]-N-ethyl-3-ethyl-3 sulfohydroxide-, benzenemethanaminium inner salt disodium salt;

5-(acetylamino)-4-hydroxy-3-(phenylazo)-2,7-naphthalenedissulfonic acid disodium salt;

2,2'-[9,10-dihydro-9,10-dioxo-1,4-anthracenediyl)-diimino]bis[5-methyl-benzenesulfonic acid disodium salt]

7-hydroxy-8-(phenylazo)-1,3-naphthalenedisulfonic acid disodium salt;

4-hydroxy-3-[[4-methyl-3-[phenylamino)sulfonyl]-phenyl]azo]-1-naphthalenesulfonic acid monosodium salt;

5-(acetylamino)-4-hydroxy-3-[(2-methylphenyl)azo]-2,7-naphthalenedisulfonic acid disodium salt;

N-ethyl-N-[4-[[4-[ethyl[(3 sulfophenyl)methyl]amino]-cyclohexadien-1-ylidene]-3-sulfo-hydroxide benzenemethanominium inner salt sodium salt;

2,2'-[(9,10-dihydro-9,10-dioxo-1,4-anthracenediyl)-diimino]bis[5 butyl-, benzenesulfonic acid]disodium salt;

2,2'-[9,10-dihydro-5,8-dihydroxy-9,10-dioxo-1,4-anthracenediyl)iimino]bis[5-methyl-benzenesulfonic acid]disodium salt;

4-[(2-hydroxy-1-naphthalenyl)azo]-benzenesulfonic acid monosodium salt;

5-(acetylamino)-3-[[4-(acetylamino)phenyl)azo]-4-hydroxy-2,7-naphthalenedisulfonic acid]disodium salt;

4-[(2-hydroxy-1-naphthalenyl)azo]-1-naphthalenesulfonic aicd monosodium salt;

5-[(2-hydroxy-1-naphthalenyl)azo]-1-naphthalenesulfonic acid monosodium salt;

5-(acetylamino)-4-hydroxy-3-phenylazo-2,7-naphthalenedisulfonic acid disodium salt;

4-hydroxy-3-[(4-sulfo-1-naphthalenyl)azo]-1-naphthalenesulfonic acid disodium salt;

3,3'-[cyclohexylidenebis[(2-methyl-4,1-phenylene) azo]]bis[4,6-dihydroxy-4-naphthalenesulfonic acid disodium salt;

7-hydroxy-8-[[4-(phenylazo)phenyl]azo]-1,3-naphthalenedisulfonic acid disodium salt;

4-[(2,4-dimethylphenyl)azo]-3-hydroxy-2,7-naphthalenedisulfonic acid disodium salt;

7-hydroxy-8-[(4-sulfo-1-naphthalenyl)azo]-1,3-naphthalenedisulfonic acid tridosium salt;

N-[-4[[4-dimethylaminio)phenyl][4-[ethyl[3-sulfophenyl)methyl]amino]phenyl]mithylene]-2,5-cyclohexadien-1-yliden]-N-ethyl-3-sulfo, benzenemethanaminium hydroxide inner salt sodium salt;

N-[-[[4-(dimethylamino)phenyl][2-ethoxy-4-[(4-methylsulfophenyl)amino]-2-sulfophenyl]methylene]-2,5-cyclohexadien-1-ylidene]-N-methylhydroxide methanaminium inner salt monosodium salt;

7-hydroxy-8-(1-naphthalenylazo)-1,3naphthalendisulfonic acid disodium salt;

N-[4-[[4-diethylamino)phenyl]phenylmethylene]-2,5-cyclohexadien-1-ylidene]-N-ethyl-ethanaminium sulfate;

4-hydroxy-5-[[(4-methylphenyl)sulfonyl]amino]-3-(phenylazo)-2-7,naphthalenedisulfonic acid disodium salt;

4-amino-3-[(2,5-dichlorophenyl)azo]-5-hydroxy-6-[[4'-[(4-hydroxyphenyl)azo][1,1'-biphenyl]-4-yl]azo]2,7-naphthalenedisulfonic acid disodium salt;

7,7'-(carbonyldiimino)bis[4-hydroxy-3-(phenylazo)-2-naphthalenedisulfonic acid disodium salt;

3-[[4-[[6-[(4-aminobenzoyl)amino]-1-hydroxy-3-sulfo-2-naphthalenyl]azo]-3,5-dimethylphenyl]azo]-1,5-naphthalenedisulfonic acid tri sodium salt;

5-[[4'-[(2-amino-8-hydroxy-6-sulfo-1-naphthalenyl)azo][1,1]-biphenyl]-4-yl]azo]-2-hydroxy-benzoic acid disodium salt;

3-[[4-(acetylamino)phenyl]azo]-4-hydroxy-7-[[[[5-hydroxy-6-(phenylazo)-7-sulfo-2-naphthalenyl]amino]carbonyl]amino]-2-naphthalenesulfonic acid disodium salt;

4-amino-5-hydroxy-6-[[4'-[(4-hydroxyphenyl)azo][1,1'-biphenyl]-4-yl]azo]-3-[(4-nithophenyl)azo]2,7-naphthalene disulfonic acid disodium salt;

4-amino-5-hydroxy-3-[[4'-[(4-hydroxyphenyl)azo][1,1-'biphenyl]-4-yl]azo]-6-(phenylazo)-2,7-naphthalenedisulfonic acid disodium salt;

5-[[4'-[[8-amino-1-hydroxy-7-[(4-nitrophenyl)azo]-3,6-disulfo-2-naphthalenyl]azo[[1,1'-biphenyl]-4-yl]azo]-2-hydroxy-benzoic acid trisodium salt;

2,-]2-(4-nitro-2-sulophenyl)ethenyl]-5-[[4-[(4-sulfophenyl)azo]phenyl]-NNO-azoxy]-benzenesulfonic acid trisodium salt;

5,5'[carbonylbis[imino(2-sulfo-4,1-phenylene)azo][-[bis[6-amino-V-hydroxy-2-naphthalenesulfonic]acid tetrasodium salt;

4,4'-[carbonylbis[imino(5-methoxy-2-methyl-4,1-phenylene)azo]]bis[5-hydroxy-2,7-naphthalenedisulfonic-acid]tetrasodium salt;

7-(benzoylamino)-4-hydroxy-3-[[4-[(4-sulfophenyl)azo]phenyl]azo]-2-naphthalenesulfonic acid disodium salt;

[-[[5,5'-[carbonlylbis[imino(2-hydroxy-5sulfo-4,1-phenylene)azo]]bis[6-hydroxy-2-naphthalenesulfonate]]ditetroammonium cuprate

[-[[7,7'-(carbonyldiimino)bis[4hydroxy-3-[(2-hydroxy-5-sulfophenyl)azo]-2-naphthalenesulfonato](8-)]]dicuprate tetrasodium;

[-[[7,7'-iminobis[4-hydroxy-3-[[2-hydroxy-5-[(methylamino)sulfonyl]phenyl]azo]-2-naphthalenesulfonato]](6-)]]dicuprate disodium;

7-(benzoylamino)-4-hydroxy-3-[[2-methoxy-5-methyl-4-[(4-sulfophenyl)azo]phenyl]azo]-2-naphthalenesulfonic acid disodium salt;

5-[[4'[(26-diamino-3-methyl-5-sulfophenyl)azo]-3,3'-dimethyl[1,1'-biphenyl]-4-yl]azo]-2-hydroxy-benzoic acid disodium salt;

7,7'-iminobis[4-hydroxy-3-(phenylazo)-2-naphthalenesulfonic acid disodium salt;

3-3'-[3,3'-dimethyl[1,1'-biphenyl]-4,4'diyl)bis(azo)]bis[4-amino-5-hydroxy-1,-naphthalenesulfonic acid disodium salt;

7,7-iminobis[4-hydroxy-3-(phenylazo)-1-naphthelenesulfonic acid disodium salt;

5-[[4'-[2-amino-8-hydroxy-6-sulfo-1-naphthalenyl)azo][1,1'biphenyl]-4-yl]azo]-2-hydroxy-benzoic acid disodium salt;

5,5'[carbonylbis[imino(1-hydroxy-3-sulfo-6,2-naphthalenediyl)azo][bis-1naphthalenesulfonic acid tetrasodium salt;

7,7'iminobis[4-hydroxy-3-(phenylazo)-2-naphthaolenesulfonic acid disodium salt;

3-[[4-(acetylamino)phenyl]azo]-4-hydroxy-7-[[[5-hydroxy-6-(phenylazo)-7-sulfo-2-naphthalenyl]amino]carbonyl]amino]-2-naphthalenesulfonic acid;

8-[[4'-[4-ethoxyphenyl)azo][1,1'-biphenyl]-4-yl]azo]-7-hydroxy-1,3-naphthalenedisulfonic acid disodium salt;

3-[[4-(acetylamino)phenyl]azo]-4-hydroxy-7-[[[[5-hydroxy-6-)phenylazo)-7-sulfo-2-naphthalenyl]amino]carbonyl]amino]-2-naphthalenesulfonic acid disodium salt;

5,5'[[1,1'biphenyl]-4,4'-diylbis(azo)]bis[6-amino-4-hydroxy-2-naphtholene sulfonic acid disodium salt;

7-amino-3-[[4'[(2-amino-8-hydroxy-6-sulfo-1-naphthalenyl)azo][1,1'-biphenyl]-4-yl]azo]-4-hydroxy-2-naphthalene sulfonic acid disodium salt;

5-[[4-[[1-hydroxy-6-(phenylamino)-3-sulfo-2-naphthalenyl]azo]-5-methoxy-2-methylphenyl]azo]-1-naphtholenesulfonic acid disodium salt.

Flurocarbon surfactants such as the material sold by the 3M Company under the trademark FC-430 FLUORAD or FC-431 FLUORAD and used in concentrations of from about 0.1 to about 1.0 weight percent to aid dispersion of the indicator powder in a solvent prior to its application to a test surface. Also suitable for use in this application is the proprietary acetylenic diol blend sold by Air Products and Chemicals, Inc. as SURFYNOL TG-E and the flurosurfactants $R_fCH_2CH_2O(CH_2CH_2O)_xH$, $R_fCH_2CH_2O(CH_2CH_2O)_xH$, $R_fCH_2CH(OCOCH_3)(CH_2N(CH_3)_2CH_2CO_2$ and $(R_fCH_2CH_2O)_{1,2}P(O)(OH)_{2,1}$ where $R_f=F(CF_2CF_2)3-8$ which are sold by DuPont, Inc. as ZONYLFSN, ZONYL FSN-100, ZONYL FSK and ZONYLUR, respectively.

The mineral carrier used to disperse the dye powder must be highly absorbant and must have a uniform particle size distribution. The particles making up the mineral carrier should have a diameter of less than 15 microns. In the preferred embodiment the average particle size of the indicator power is greater than 1 micron and less than 10 microns. The small concentration of dye used when compared to the large volume of mineral carrier provides a product having only a small amount of color which is apparent to the eye when the dry indicator powder is applied to a test surface thus providing the basis for an easily detectable color change if the indicator powder is wet by hydrocarbon fuel from a leak. As previously stated, the dye does not migrate from the mineral carrier to penetrate the painted surface being tested and cause a strain because it is unsoluble in hydrocarbon liquids.

Figure 2:
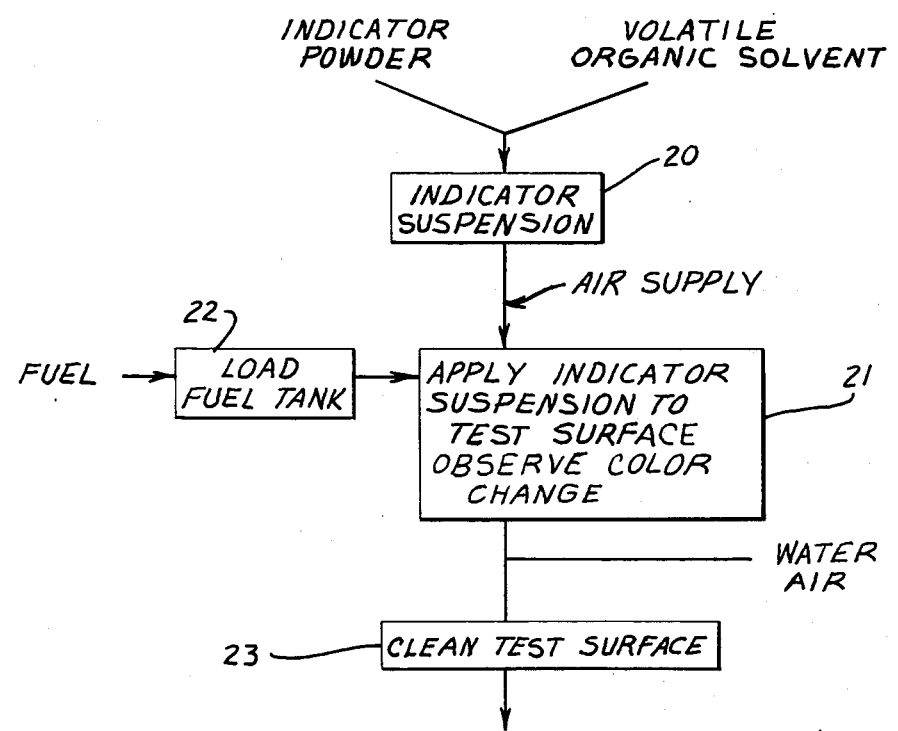
FIG. 2 is a block diagram illustrating the steps of a method of a preferred embodiment of the invention.

When conducting a test for fuel tank leaks in accordance with the method schematically represented in FIG. 2, the dye indicator powder is combined with a highly volatile organic solvent to form an indicator suspension 20. The indicator suspension is then applied to certain specified test surfaces at joints and around fasteners adjacent to fuel tanks to provide a thin film of dry powder on the test surface. This application is generally accomplished by spraying the indicator suspension using a standard venturi type spray apparatus and compressed air. The pressure of the compressed air should not exceed 45 psi because pressures in excess of 45 psi tend to cause surface damage to the painted test surface because of a sand blasting effect that results from the application of hard mineral particles to the soft painted surface under pressure. This problem is aggravated by the tendency of the organic solvent used in the suspension to dissolve or soften the surface of the paint thereby allowing suitably soluble dyes to migrate to the painted surface.

When applied the indicator powder is a light pink color if croceine dye is used. The color will turn to a bright red upon contract with fuel. The test does not require croceine dye or a pink to red color change in order to be successful. In order to successfully conduct the test, the dye chosen should be water or short chain alcohol soluble and when prepared as hereinbefore described should provide sufficient color contrast between the dry powder and fuel wet indicator to be easily discernable to the naked eye. Upon completion of the test the indicator powder is removed from the test surface by flushing the area with water, or by brushing, or by blowing the powder away with compressed air. As an alternative method of applying the indicator powder to the test surface, an aerosol spray could be used. This method would be particularly useful if the test were conducted under field conditions when large equipment and compressed air might not be available.

Generally, top coats used on the painted test surfaces are a metallic gray color which has been applied over a bright yellow primer. The dye used in the indicating powder should contrast well with these colors to faciliate ease in detecting leaks. Red, pink, violet and bright green dyes have been found to work well in this regard.

One advantage of using the test method and indicator powder disclosed and claimed herein arises from the insolubility of the dyes used in hydrocarbon fuels because water or other polar liquids will not give the color change and large color area representative of hydrocarbon fuel but will instead give only a small area of less intense color which will appear as a narrow advancing front moving away from the initial point of wetting. For example, a water leak specifically causes the dye to migate leaving a dark circle with a white center.

Organic solvents which are acceptable for mixing the indicator suspension applied to the test surfaces are 1,1,1 trichloroethane, 1,1,2 trichloro-1,2,2 trifluorethane; 1,1,2 trichloroethane; trichloroethylene, sym-tetrachlorodifluoroethane; sym-dischloroethylene; methylethyl ketone; 2-butanone, kexane, keptane, octane; 2-propanone; ethlacetate; cyclohexane, cyclohexene and mixtures thereof. Generally, the indicator suspension consists of from about 10 to about 30 volume percent of the indicator powder and from about 70 to about 90 volume percent of volatile organic solvent. Excellent results have been obtained with a 20 percent to 80 percent indicator-solvent mix ratio. If the indicator suspension is to be applied from an aerosol can it will also include a suspending agent such as aluminum stearate, magnesium stearate, calcium stearate or stearic acid. On occasion and depending on the solvent used, mixtures of suspending agents may be used as well as a mechanical mixing device contained within the aerosol container to faciliate an even application of indicator powder to the painted test surface.

While the invention has been particularly shown and described with reference to specific embodiments thereof, it will be understood by those skilled in the art that various changes in form and detail may be made therein without departing from the spirit and scope of the invention as defined by the appended claims.

I claim:

1. A composition of matter suitable for detecting hydrocarbon leaks consisting essentially of a dry powder containing from about 0.1 to about 5.0 percent by weight of a dye soluble in water and lower chain alcohols which will provide vivid color when wet with hydrocarbon fuel and which is essentially nonstaining on painted surfaces, and which does not migrate into or penetrate painted surfaces containing a polyurethane or epoxy resin base from about 0.1 to about 1.0 percent of a surfactant with the balance of said composition of matter consisting essentially of dry inert mineral carrier.

2. The composition of matter of claim 1 wherein said inert mineral carrier is selected from a group consisting of diatomaceous earth, kaolin clay, talc, fumed silica, silicon dioxide and mixtures thereof.

3. The composition of matter of claim 1 wherein said dye is selected from a group consisting of:
7-hydroxy-8-(4-phenylazophenylazo)-1,3-naphthalindesulfonic acid disodium salt;
4,6-dihydroxy-3[4-[1-[4-[[1-hydroxy-7-[(phenylsulfonyl)oxy]-3-sulfo-2-naphthalenyl]azo]phenyl]cyclohexyl]phenyl]azo]-2-naphthalenesulfonic acid disodium salt;
N-[4-[[4-(diethylamino)phenyl][4-[ethyl[3-sulfophenyl)methyl]amino]phenyl]methylene]-2,5-cyclohexadien-1-yliden]-N-ethyl-3-ethyl-3sulfohydroxide-, benzenemethanaminium inner salt disodium salt;
5-(acetylamino)-4-hydroxy-3-(phenylazo)-2,7-naphtalenedissulfonic acid disodium salt;
2,2'-[9,10-dihydro-9,10-dioxo-1,4-anthracenediyl)-diimino]bis[5-methyl-benzenesulfonic acid disodium salt]
7-hydroxy-8-(phenylazo)-1,3-naphthalenedisulfonic acid disodium salt;
4-hydroxy-3-[[4-methyl-3-[phenylamino)sulfonyl]-phenyl]azo]-1-naphthalenesulfonic acid monosodium salt;
5-(acetylamino)-4-hydroxy-3-[(2-methylphenyl)azo]-2,7-naphthalenedisulfonic acid disodium salt;
N-ethyl-N-[4-[[4-[ethyl[3sulfophenyl)methyl]amino]cyclohexadien-1-ylidene]-3-sulfo-hydroxide benzenemethanominium innner salt sodium salt;
2,2'-[(9,10-dihydro-9,10-dioxo-1,4-anthracenediyl)-diimino]bis[5butyl-,benzenesulfonic acid[disodium salt;
2,2'-[9,10-dihydro-5,8-dihydroxy-9,10-dioxo-1,4-anthracenediyl)diimino]bis[5-methyl-benzenesulfonic acid]disodium salt;
4-[(2-hydroxy-1-naphthalenyl)azo]-benzenesulfonic acid monosodium salt;
5-(acetylamino)-3-[[4-(acetylamino)phenyl)azo]-4-hydroxy-2,7-naphthalenedisulfonic acid]disodium salt;
4-[(2-hydroxy-1-naphthalenyl)azo]-1-napthalenesulfonic acid monosodium salt;
5-[(2-hydroxy-1-naphthalenyl)azo]-1-naphthalenesulfonic acid monosodium salt;
5-(acetylamino)-4-hydroxy-3-phenylazo-2,7-naphthalenedisulfonic acid disodium salt;
4-hydroxy-3-[(4-sulfo-1-naphthalenyl)azo]-1-naphthalenesulfonic acid disodium salt;
3,3'-[cyclohexylidenebis[(2-methyl-4,1-phenylene)azo]]bis[4,6-dihydroxy-4-naphthalenesulfonic acid disodium salt;
7-hydroxy-8-[[4-(phenylazo)phenyl]azo]-1,3-naphthalenedisulfonic acid disodium salt;
4-[(2,4-dimethylphenyl)azo]-3-hydroxy-2,7-naphthalenedisulfonic acid disodium salt;
7-hydroxy-8-[(4-sulfo-1-naphthalenyl)azo]-1,3,-naphthalenedisulfonic acid tridosium salt;
N-[-4[[4-dimethylamino)phenyl][4-[ethyl[3-sulfophenyl)methyl]amino]phenyl]mithylene]-2,5-cyclohexadien-1-yliden]-N-ethyl-3-sulfo,benzenemethanaminium hydroxide inner salt sodium salt;
N-[-[[4-(dimethylamino)phenyl][2-ethoxy-4-[(4-methylsulfophenyl)amino]-2-sulfophenyl]methylene]-2,5-cyclohexadien-1-ylidene]-N-methylhydroxide methanaminium inner salt monosodium salt;
7-hydroxy-8-(1-naphthalenylazo)-1,3naphthalendisulfonic acid disodium salt;
N-[4-[[4-diethylamino)phenyl]phenylmethylene]-2,5-cyclohexadien-1-ylidene]-N-ethyl-ethanaminium sulfate;
4-hydroxy-5-[[(4-methylphenyl)sulfonyl]amino]-3-(phenylazo)-2-7,naphthalenedisulfonic acid disodium salt;
4-amino-3-[(2,5-dichlorophenyl)azo]-5-hydroxy-6-[[4'-[(4-hydroxyphenyl)azo][1,1'-biphenyl]-4-yl]azo]2,7-naphthalenedisulfonic acid disodium salt;
7,7'-(carbonyldiimino)bis[4-hydroxy-3-(phenylazo)-2-naphthalenesulfonic acid disodium salt;
3-[[4-[[6-[(4-aminobenzoyl)amino]-1-hydroxy-3-sulfo-2-naphthalenyl]azo]-3,5-dimethylphenyl]azo]-1,5-naphthalenedisulfonic acid tri sodium salt;
5-[[4'-[(2-amino-8-hydroxy-6-sulfo-1-naphthalenyl)azo][1,1]-biphenyl]-4-yl]azo]-2-hydroxy-benzoic acid disodium salt;
3-[[4-(acetylamino)phenyl]azo]-4-hydroxy-7-[[[[5-hydroxy-6-(phenylazo)-7-sulfo-2naphthalenyl]amino]carbonyl]amino]-2naphthalenesulfonic acid disodium salt;
4-amino-5-hydroxy-6-[[4'-[(4-hydroxyphenyl)azo][1,1'-biphenyl]-4-yl]azo]-3-[(4-nithophenyl)azo]2,7-naphthalene disulfonic acid disodium salt;
4-amino-5-hydroxy-3-[[4'-[(4-hydroxyphenyl)azo][1,1-'biphenyl]-4-yl]azo]-6-(phenylazo)-2,7-naphthalenedisulfonic acid disodium salt;

5-[[4'-[[8-amino-1-hydroxy-7-[(4-nitrophenyl)azo]-3,6-disulfo-2-naphthalenyl]azo[[1,1'-biphenyl]-4-yl]azo]-2-hydroxy-benzoic acid trisodium salt;

2,-]2-(4-nitro-2-sulophenyl)ethenyl]-5-[[4-[(4-sulfophenyl)azo]phenyl]-NNO-azoxy]-benzenesulfonic acid trisodium salt;

5,5'[carbonylbis[imino(2-sulfo-4,1-phenylene)azo][-[bis[6-amino-V-hydroxy-2-naphthalenesulfonic]acid tetrasodium salt;

4,4'-[carbonylbis[imino(5-methoxy-2-methyl-4,1-phenylene)azo]]bis[5-hydroxy-2,7-naphthalenedisulfonic-acid]tetrasodium salt;

7-(benzoylamino)-4-hydroxy-3-[[4-[(4-sulfophenyl)azo]phenyl]azo]-2-naphthalenesulfonic acid disodium salt;

[-[[5,5'-[carbonlylbis[imino(2-hydroxy-5sulfo-4,1-phenylene)azo]]bis[6-hydroxy-2-naphthalenesulfonate]]ditetroammonium cuprate

[-[[7,7'-(carbonyldiimino)bis[4hydroxy-3-[(2-hydroxy-5-sulfophenyl)azo]-2-naphthalenesulfonato](8-)]]dicuprate tetrasodium;

[-[[7,7'-iminobis[4-hydroxy-3-[[2-hydroxy-5-[(methylamino)sulfonyl]phenyl]azo]-2-naphthalenesulfonato]](6-)]]dicuprate disodium;

7-(benzoylamino)-4-hydroxy-3-[[2-methoxy-5-methyl-4-[(4-sulfophenyl)azo]phenyl]azo]-2-naphthalenesulfonic acid disodium salt;

5-[[4'[(26-diamino-3-methyl-5-sulfophenyl)azo]-3,3'-dimethyl[1,1'-biphenyl]-4-yl]azo]-2-hydroxy-benzoic acid disodium salt;

7,7'-iminobis[4-hydroxy-3-(phenylazo)-2-naphthalenesulfonic acid disodium salt;

3-3'-[3,3'-dimethyl[1,1'-biphenyl]-4,4'diyl)bis(azo)]-bis[(4-amino-5-hydroxy-1,-naphthalenesulfonic acid disodium salt;

7,7'-iminobis[4-hydroxy-3-(phenylazo)-1-naphthelenesulfonic acid disodium salt;

5-[[4'-[2-amino-8-hydroxy-6-sulfo-1-naphthalenyl)azo][1,1'biphenyl]-4-yl]azo]-2-hydroxy-benzoic acid disodium salt;

5,5'[carbonylbis[imino(1-hydroxy-3-sulfo-6,2-naphthalenediyl)azo][bis-1naphthalenesulfonic acid tetrasodium salt;

7,7'iminobis[4-hydroxy-3-(phenylazo)-2-naphthaolenesulfonic acid disodium salt;

3-[[4-(acetylamino)phenyl]azo]-4-hydroxy-7-[[[5-hydroxy-6-(phenylazo)-7-sulfo-2-naphthalenyl]amino]carbonyl]amino]-2-naphthalenesulfonic acid;

8-[[4'-[4-ethoxyphenyl)azo][1,1'-biphenyl]-4-yl]azo]-7-hydroxy-1,3-naphthalenedisulfonic acid disodium salt;

3[[4-(acetylamino)phenyl]azo]-4-hydroxy-7-[[[[5-hydroxy-6-)phenylazo)-7-sulfo-2-naphthalenyl]amino]carbonyl]amino]-2-naphthalenesulfonic acid disodium salt;

5,5'[[1,1'biphenyl]-4,4'-diylbis(azo)]bis[6-amino-4-hydroxy-2-naphtholene sulfonic acid disodium salt;

7-amino-3-[[4'[(2-amino-8-hydroxy-6-sulfo-1-naphthalenyl)azo][1,1'-biphenyl]-4-yl]azo]-4-hydroxy-2-naphthalene sulfonic acid disodium salt; and 5-[[4-[[1-hydroxy-6-(phenylamino)-3-sulfo-2-naphthalenyl]azo]-5-methoxy-2methylphenyl]azo]-1-naphtholenesulfonic acid disodium salt.

4. The composition of matter of claim 1 wherein the said inert mineral carrier is of a uniform particle size, said particles having a diameter greater than one micron and less than 15 microns.

5. The composition of matter of claim 4 wherein said mineral carrier particles have a diameter greater than one micron and less than 10 microns.

6. The composition of matter of claim 1 wherein said lower chain alcohols include those alcohols having a chain form of from one to four carbon atoms in length.

7. The composition of matter of claim 1, wherein said surfactant is selected from a group consisting of: flurocarbons acetylenic diols and flurosurfactants represented generally by the formulas $R_fCH_2O(CH_2CH_2O)_xH$, $R_fCH_2CH_2O(CH_2CH_2O)_xH$, $R_fCH_2CH(OCOCH_3)(CH_2N(CH_3)_2CH_2CO_2$ and $(R_fCH_2CH_2O)_{1,2}P(O)(OH)_2$ where $R_f=F(CF_2CF_2)_{3-8}$.

8. A composition of matter suitable for detecting hydrocarbon fuel leaks consisting essentially of from about one to about twenty percent by volume of an inert mineral carrier, a water soluble sodium salt of a sulfonic acid of an azo dye having a concentration of from about 0.1 to about 5.0 percent by weight of said inert mineral carrier, said dye being essentially nonstaining on painted surfaces, said painted surfaces containing a polyurethane or epoxy resin base, and from about 0.1 to about 1.0 percent of a surfactant with the balance of said composition of matter being a volatile liquid carrier into which said inert mineral carrier, said water soluble salt of an azo dye and said surfactant are dispersed.

* * * * *